(12) United States Patent
Irish et al.

(10) Patent No.: US 9,535,972 B2
(45) Date of Patent: Jan. 3, 2017

(54) COMPUTER-IMPLEMENTED SYSTEM AND METHOD FOR GENERATING WAYMARKS

(71) Applicant: Groundspeak, Inc., Seattle, WA (US)

(72) Inventors: Jeremy A. Irish, Seattle, WA (US); Sean E. Boots, Renton, WA (US); Elias C. Alvord, Seattle, WA (US)

(73) Assignee: Groundspeak, Inc., Seattle, WA (US)

( * ) Notice: Subject to any disclaimer, the term of this patent is extended or adjusted under 35 U.S.C. 154(b) by 54 days.

(21) Appl. No.: 13/893,220

(22) Filed: May 13, 2013

(65) Prior Publication Data

US 2013/0254198 A1    Sep. 26, 2013

Related U.S. Application Data

(63) Continuation of application No. 12/335,513, filed on Dec. 15, 2008, now Pat. No. 8,442,963, which is a continuation of application No. 11/142,945, filed on Jun. 1, 2005, now Pat. No. 7,467,147.

(51) Int. Cl.
G06F 17/30 (2006.01)

(52) U.S. Cl.
CPC ... G06F 17/30595 (2013.01); G06F 17/30241 (2013.01); G06F 17/30873 (2013.01); Y10S 707/99932 (2013.01); Y10S 707/99933 (2013.01)

(58) Field of Classification Search
CPC .................. G06F 17/30265; G06F 17/30038; G06F 17/30241; G06F 17/30064; G06F 17/30864; G06F 17/3089
See application file for complete search history.

(56) References Cited

U.S. PATENT DOCUMENTS

| 6,766,245 | B2 | 7/2004 | Padmanabhan |
| 6,889,247 | B2 | 5/2005 | Christie et al. |
| 6,933,857 | B2 * | 8/2005 | Foote ...................... 340/870.02 |
| 6,985,905 | B2 | 1/2006 | Prompt et al. |
| 6,985,929 | B1 | 1/2006 | Wilson et al. |
| 7,054,741 | B2 * | 5/2006 | Harrison et al. .............. 701/522 |
| 7,068,309 | B2 | 6/2006 | Toyama et al. |
| 7,089,198 | B2 | 8/2006 | Freedenberg et al. |
| 7,107,285 | B2 | 9/2006 | von Kaenel et al. |
| 7,231,400 | B2 | 6/2007 | Cameron et al. |

(Continued)

OTHER PUBLICATIONS

Liu et al., "Resource Annotation Framework in a Georeferenced and Geospatial Digital Library," Proceedings of the 5th International Conference on Asian Digital Libraries, Lecture Notes in Computer Science 2555, pp. 287-298, Singapore (Dec. 11-14, 2002).

*Primary Examiner* — Angelica Ruiz
(74) *Attorney, Agent, or Firm* — Patrick J.S. Inouye; Krista A. Wittman

(57) ABSTRACT

A computer-implemented system and method for generating waymarks is provided. A database of waymarks is maintained. Each waymark is associated with a category. A new waymark is generated. Geospatial data defining a location, metadata describing a physical object associated with the location, and at least one photograph of the location are received from a user. The geospatial data, metadata, and photograph are complied as the new waymark. One of the categories is assigned to the new waymark. The new waymark is added to the database. A search option is provided for accessing the waymark by at least one of the location and category.

20 Claims, 12 Drawing Sheets

(56) References Cited

U.S. PATENT DOCUMENTS

| | | |
|---|---|---|
| 7,236,173 B2 | 6/2007 | Chithambaram et al. |
| 7,421,476 B2 | 9/2008 | Weaver |
| 7,848,765 B2 * | 12/2010 | Phillips et al. ............ 455/456.3 |
| 2002/0055924 A1 * | 5/2002 | Liming ........................ 707/100 |
| 2003/0189592 A1 | 10/2003 | Boresjo |
| 2003/0215110 A1 * | 11/2003 | Rhoads et al. ................ 382/100 |
| 2004/0066391 A1 | 4/2004 | Daily et al. |
| 2004/0070678 A1 * | 4/2004 | Toyama et al. ............ 348/231.3 |
| 2004/0215626 A1 | 10/2004 | Colossi et al. |
| 2005/0038825 A1 * | 2/2005 | Tarabzouni ............ G06Q 50/06 |
| 2005/0063083 A1 | 3/2005 | Dart et al. |
| 2005/0132224 A1 | 6/2005 | Estrada et al. |
| 2005/0156715 A1 | 7/2005 | Zou et al. |
| 2005/0165861 A1 | 7/2005 | Christie et al. |
| 2005/0228665 A1 | 10/2005 | Kobayashi et al. |
| 2006/0041375 A1 | 2/2006 | Witmer et al. |
| 2006/0136127 A1 | 6/2006 | Coch et al. |
| 2006/0167937 A1 | 7/2006 | Tierney |
| 2006/0244830 A1 | 11/2006 | Davenport et al. |

\* cited by examiner

CATEGORY MANAGEMENT

Edit Lighthouse Variables

Variable Display Text:
Lighthouse Color

Variable Type:
Dropdown List

☐ Check here if variable answer is optional
☐ Archive Variable

Submit

Lighthouse Color Options:

| ID | Name | Display Order | | |
|----|------|---------------|---|---|
| 14 | red | 1 | edit | archive |
| 15 | blue | 2 | edit | archive |
| 16 | yellow | 3 | edit | archive |
| 17 | green | 4 | edit | archive |

Add New Option:
Name: _____  Display Order: __  [Add New Option]

111

You Are Here
Test Coordinate
change my location
map it!
view Test Coordinate
coordinates

112

Variable Options
▸ Add New Lighthouse Variable
▸ Edit Lighthouse Category
▸ Manage Lighthouses
▸ My Categories
▸ Transfer Lighthouse Ownership

113 you are logged in as bootron log out home > My Page > My Categories > Manage Lighthouses > Edit Lighthouse Variables

GETTING STARTED
DIRECTORY
MY PAGE
FORUMS
RESOURCES
CONTACT US

Copyright © 2005 Groundspeak, Inc | Click here to view our logo usage policy

MY LOGS

Total Records: 14 -- Page: 1 of 1          Prev. << < [1] > >> Next

| Log | Rating | Date Logged | | |
|---|---|---|---|---|
| bootron visited Lighthouse Test | | 5/17/2005 | [edit] | [view] |
| bootron couldn't find K 384 | | 5/16/2005 | [edit] | [view] |
| bootron visited NewTest | | 5/13/2005 | [edit] | [view] |
| bootron visited K 384 | ★☆☆☆☆ | 5/12/2005 | [edit] | [view] |
| bootron visited KING COUNTY AIRPORT BEACON | ★★★★☆ | 5/11/2005 | [edit] | [view] |
| bootron visited L 264 | ★★★★★ | 5/11/2005 | [edit] | [view] |
| bootron couldn't find L 264 | | 5/11/2005 | [edit] | [view] |
| bootron visited HAFF | ★★★☆☆ | 5/17/2005 | [edit] | [view] |
| bootron visited SWINOMISH CHAN E POWER POLE | ★☆☆☆☆ | 11/30/2003 | [edit] | [view] |
| bootron couldn't find Q 462 | ★★☆☆☆ | 4/13/2003 | [edit] | [view] |
| bootron couldn't find Q 462 | | 9/14/2002 | [edit] | [view] |
| bootron visited RENTON DIST 90 STANDPIPE NO 3 | ★★☆☆☆ | 9/6/2002 | [edit] | [view] |

Total Records: 14 -- Page: 1 of 1          Prev. << < [1] > >> Next home > My Page > My Logs

GETTING STARTED
DIRECTORY
MY PAGE
FORUMS
RESOURCES
CONTACT US you are logged in as bootron log out You Are Here
Test Coordinate
change my location
map it!
view Test Coordinate coordinates My Page Options
- My Account
- My Categories
- My Coordinates
- My Waymarks

142

Copyright © 2005 Groundspeak, Inc. | Click here to view our logo usage policy

COMPUTER-IMPLEMENTED SYSTEM AND METHOD FOR GENERATING WAYMARKS

CROSS-REFERENCE TO RELATED APPLICATION

This application is a continuation of U.S. Pat. No. 8,442,963, issued May 14, 2013; which is a continuation of U.S. Pat. No. 7,467,147, issued Dec. 16, 2008; the priority dates of which are claimed and the disclosures of which are incorporated by reference.

FIELD

The invention relates in general to on-line data collaboration and, specifically, to a system and method for compiling geospatial data for on-line collaboration.

BACKGROUND

Global Positioning System (GPS) receivers have become increasingly popular as personal navigational aids and, more frequently, as features integrated into consumer electronics, such as cellular telephones and wireless personal data assistants, as well as automobile navigation systems. GPS signals are received from a constellation of navigational satellites and processed into locational coordinates. GPS receivers are passive devices that provide locational data only, which must be combined with maps, charts, and other navigational aids to bring meaning to the latitude and longitude coordinates. Integrating GPS receivers into consumer electronics or navigation systems has enabled users to retrieve helpful travel-related information and, in some configurations, to store additional information. However, such information generally remains personal to the user, unless specifically shared or posted through some form of digital data communications, such as e-mail, text messaging, or Web sites.

Recently, Web logs or "blogs," have begun to proliferate as a new form of Web-based digital data communication. Blogs are on-line forums for the sharing of the personal thoughts of a "blogger," as well as other types of information, such as images, sounds, and video clips. Blogs are publicly accessible journals or diaries that are often updated on a frequent basis. Blog readers are invited to post their comments and submit their own information for other readers to consider.

Blogs are a form of interactive Web site with content written and published by the individual blogger. Typically, blogs include an unstructured text narrative that might be organized by date or topic, yet can often cover rambling and wide-ranging topics, as reflected by the blogger's personal tastes. Still, blog information can be useful, such as where a blogger chronicles travels in a region of particular interest. Regular readers can generally identify pertinent travel information easily. However, other readers must use search engines or similar technologies to mine pertinent travel information out of the blog and, once found, such information may not be of the type or caliber sought.

While travel-themed blogs can potentially provide valuable personal travel insights, on-line databases of locational information can also provide travel information, but in a more structured and consistent form. These databases are often well-indexed and searchable, but esoteric information is rare and the sharing of personalized travel information is generally unsupported or unavailable. Furthermore, locations of arcane or limited interest, such as vacuum cleaner museums, may not be available in locational information databases. As well, these types of locations may not be of a sufficient interest level to warrant the time and expense of a dedicated Web site for those aficionados so inclined.

Moreover, such databases, when organized by geolocational data, such as available though a GPS, are frequently structured to address the narrow problem of providing an identity to a set of raw coordinates. Frequently, the geolocational data is indexed under pre-defined categories or key words without provision for adding additional information or user personalization. Moreover, the structure and content is generally managed by a private database administrator, which does not allow for shared on-line customization or collaboration.

Therefore, there is a need for an approach to providing an on-line compendium of arbitrary unstructured geolocational data and associated metadata. Preferably, such an approach would provide a customizable data collection navigable in outline form and searchable by coordinates and other parameters. Such an approach would preferably further accommodate different types of data in various formats as the metadata with controllable and transferable permissions.

SUMMARY

A system and method includes a centralized database for storing waymarks. Each waymark provides an unstructured cache of information that associates geospatial data with metadata. The waymarks are organized into a schema of directories, categories, and subcategories that can be navigated by, for instance, topic, and which can be searched, for example, by content or geolocational data. Variables and attributes can be individually specified for each category or subcategory to organize the types of metadata associated with particular waymarks. Permissions control the addition, editing, and deletion of waymarking data from the database. Waymarks can be posted into the categories and subcategories and a set of log entries allow user commentary and exchange regarding posted waymarks. In a further embodiment, the waymarking data can be exported as a portable schema that enables other applications to read, display, and download the waymarking data.

One embodiment provides a computer-implemented system and method for generating waymarks. A database of waymarks is maintained. Each waymark is associated with a category. A new waymark is generated. Geospatial data defining a location, metadata describing a physical object associated with the location, and at least one photograph of the location are received from a user. The geospatial data, metadata, and photograph are complied as the new waymark. One of the categories is assigned to the new waymark. The new waymark is added to the database. A search option is provided for accessing the waymark by at least one of the location and category.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 11 is a screen shot showing, by way of example, a Web page for editing category variables.

FIG. 13 is a screen shot showing, by way of example, a Web page for viewing search results.

FIG. 14 is a screen shot showing, by way of example, a Web page for a set of log entries regarding waymarks.

DETAILED DESCRIPTION

Geospatial Data and Metadata Collection

Figure 1:
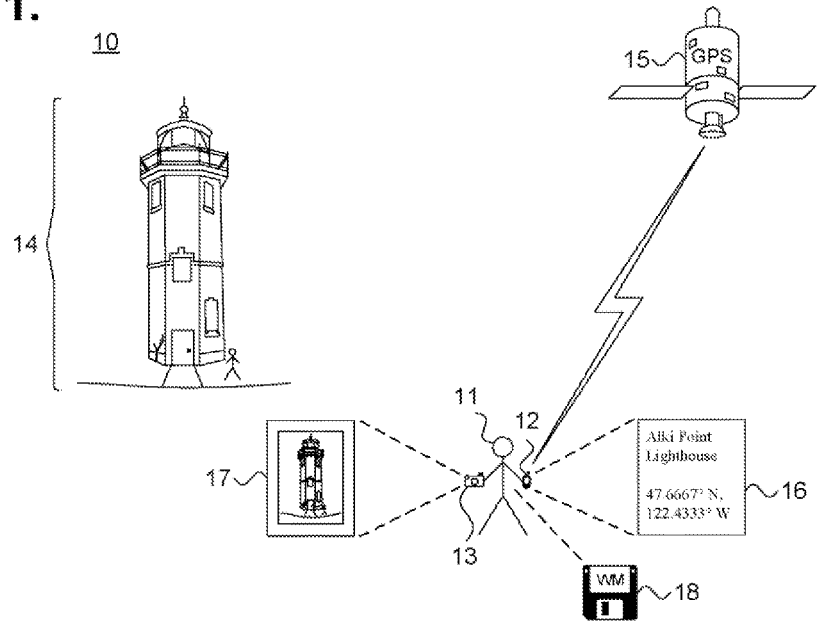
FIG. 1 is a block diagram showing, by way of example, collection of geospatial data and metadata at a waymark.

In general, waymarks associate metadata about people, places, and things with geospatial data, although other types of geospatial data associations are possible. FIG. 1 is a block diagram showing, by way of example, collection 10 of geospatial data 16 and metadata 17 at a waymark location 14. An individual 11, such as a traveler or local resident, decides to create a waymark 18 for a particular location 14. A waymark 18 is an unstructured cache of information that includes metadata and geolocational data, such as GPS coordinates. The metadata includes digitally-storable information that can be used to describe or be associated with some physical object, such as narrative text containing comments, ratings, physical characteristics, construction, color, dimensions, and so forth, images, sound, video, and other forms of data or any combinations thereof. Other types of metadata are possible. As used herein, the terms "geospatial" and "geolocational" are interchangeable and imply the same meanings. In addition, the physical object described or associated using a waymark 18 can be a place, such as location 14, or any other kind of physical object, including people and things, that can be associated with geolocational data. The physical object need not be stationary nor earthbound. Rather, a physical object could be moving or be temporarily still and could be found on the land, water, air, under ground, above ground, or in space. Other types of physical objects and spatial orientations are possible.

Conveniently, the individual 11 is carrying a GPS receiver 12 and a digital camera 13. The individual 11 uses the GPS receiver 12 to receive geospatial data 16 from a GPS system 15, which can include conventional out-of-doors GPS signals, as well as repeated GPS signals configured to be received indoors or from stationary beacons providing GPS-like signals from a stationary permanent position. Other types of geospatial data sources are possible. The geospatial data 16 includes, for instance, latitude, longitude, altitude, and precision, which can be used to identify the global location of location 14. Other types of geospatial data are possible. The GPS receiver 12 could be a standalone device or integrated into a consumer electronic device, such as a cellular telephone, wireless personal data assistant, automobile navigation system, or other GPS-enabled device.

The individual 11 also uses the digital camera 13 to take a digital picture of the physical object, such as a lighthouse, appearing at the location 14. The digital picture can be associated with the geospatial data 16 as metadata 17. Other types of devices either in lieu of or in addition to a digital camera 17, such as a personal data assistant or notebook computer, audio or video recorder, film camera, or any other type of device capable of fixing an expression describing or regarding the physical object in a tangible medium is possible. The geospatial data 16 and metadata 17 together form the waymark 18, which can be compiled into a sharable on-line database of geospatial data with an exportable schema, as further described below beginning with reference to FIG. 3.

Zones of Influence

Figure 2:
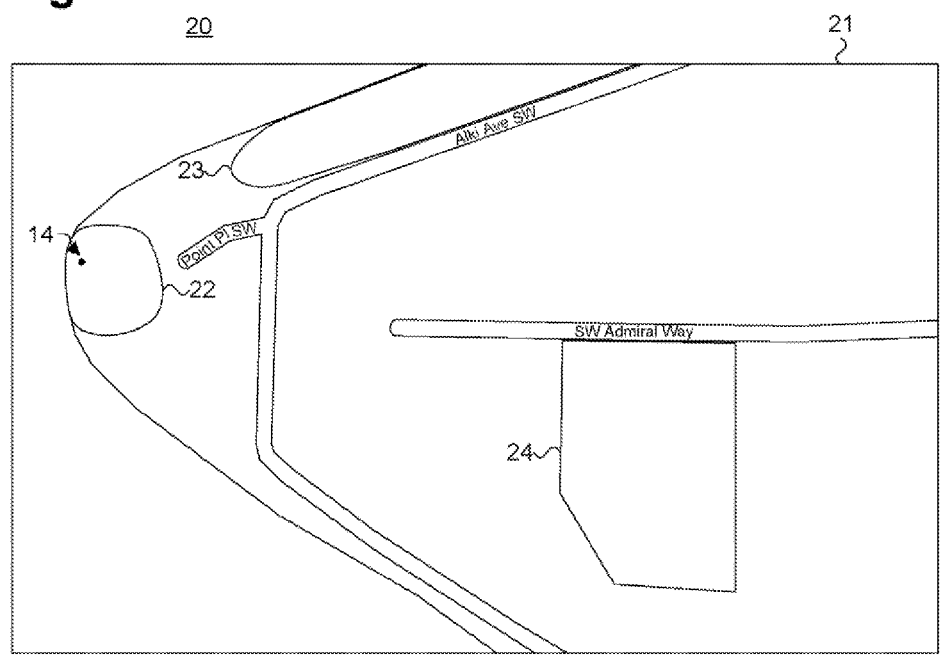
FIG. 2 is a map diagram showing, by way of example, zones of influence overlaid on the waymark of FIG. 1.

In a further embodiment, the location 14 of a physical object described by a waymark 18 can be placed within a zone of influence. FIG. 2 is a map diagram 20 showing, by way of example, zones of influence 22, 23, 24 overlaid on the waymark location 14 of FIG. 1. A zone of influence is stored geolocational data that forms a logically-enclosed physical space. Zones of influence can be defined in mutually exclusive, overlapping, and encapsulating or nested arrangements of various shapes and sizes, both immediately about or proximal to a particular waymark location 14. In addition, events can be logically linked to one or more of the zones of influence and can be triggered based on locational, temporal, and independent conditions, such as described in commonly-assigned U.S. Pat. No. 6,691,032 to Irish et al. on Feb. 10, 2004, the disclosure of which is incorporated by reference.

As an example, the neighborhood areas 21 proximal to the waymark location 14 can be surveyed to identify those physical areas around which zones of influence could be defined to supplement the waymark 18. For instance, the immediate area surrounding the waymark location 14, such as a lighthouse park, could be logically defined as a first zone of influence 22. Similarly, a nearby waterfront beach area could be logically defined as another zone of influence 23. Finally, a public playground that includes baseball diamonds could be logically enclosed in a further zone of influence 24.

On-Line Geospatial Data Compilation and Collaboration Environment

Figure 3:
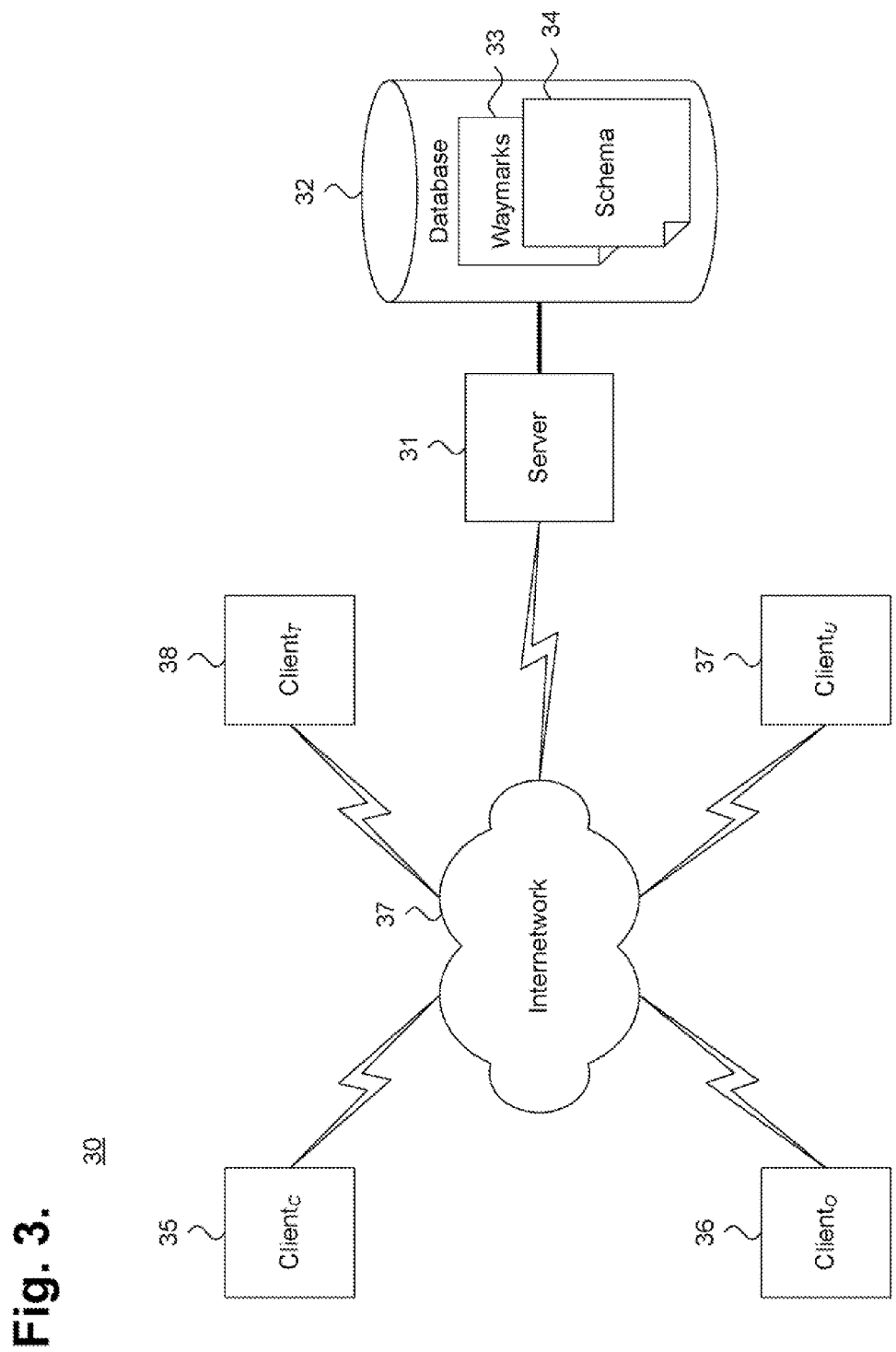
FIG. 3 is a functional block diagram showing an on-line geospatial data compilation and collaboration environment, in accordance with one embodiment.

Waymarks associate geospatial data 16 and metadata 17, which can be shared by an on-line community of users. FIG. 3 is a functional block diagram showing an on-line geospatial data compilation and collaboration environment 30, in accordance with one embodiment. Shared waymarks 33 are centrally stored in a database 32 with an exportable schema 34 managed by a server 31. In addition, the server 31 allows users to log their personal interactions with the physical objects described by or associated with waymarks 33 and publishes the waymarks 33 for on-line collaboration, as further described below with reference to FIG. 15.

On-line users can access the server 31 over an internetwork 37, such as the Internet, to compile new waymarks 33 into the database 32 and to collaborate and share their personal experiences. To facilitate user navigation and searching, the waymarks 33 and the metadata 17 are organized into data and metadata hierarchies, as further described below respectively with reference to FIGS. 4 and 5. The structuring of the database 32 and the waymarks 33 stored in the database 32 together form waymarking data.

Figure 6:
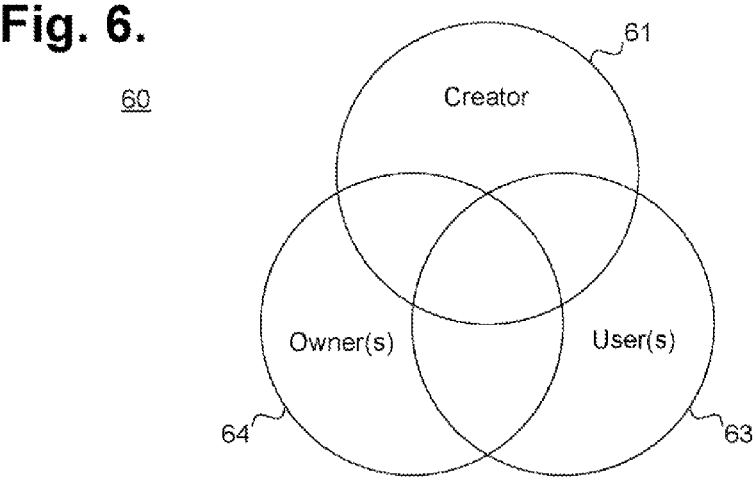
FIG. 6 is a Venn diagram showing ownership and control over the database of FIG. 3.

In addition, the server 31 provides ownership controls over the database 32 for each creator client 35, Client$_C$, owner client 36, Client$_O$, and user client 37, Client$_U$, as further described below with reference to FIG. 6. The clients 35, 36, 37 form the user community having direct management over and access to the waymarks 33. The clients 35, 36, 37 are not necessarily separate computer systems, but are logically identified as separate ownership entities that affect the types of operations that can be performed on the database 32. Other types of ownership entities are possible.

Finally, the server 31 exports a schema 34 to describe and validate the waymarks 33 and to enable other applications, such as executing on a third party client 38, Client$_T$, to access and download the waymarking data. In providing the schema 34, the server 31 functions as a toolbox that facilitates distributed on-line sharing of ad hoc geospatial data. Waymark schemas can be dynamically created based on the variables and attributes for a particular waymark category or subcategory. For example, a schema for a lighthouses category could contain "DateBuilt" and "Color" variables, whereas a schema for a factory tours category could contain "Produces" and "HoursOfOperation" variables. Other types of waymark schemas are possible.

Data Hierarchy

Figure 4:
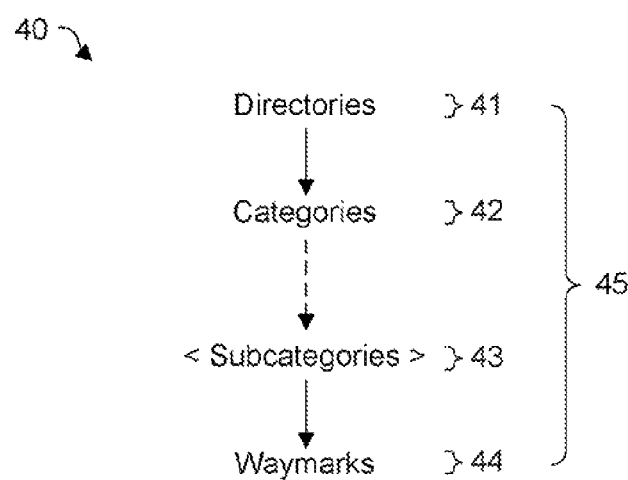
FIG. 4 is a data diagram showing a data hierarchy for use in the environment of FIG. 3.

The structure for storing the waymarks 33 is organized into a hierarchy that can form the exportable schema. FIG. 4 is a data diagram showing a data hierarchy 40 for use in the environment 30 of FIG. 3. When posted into the database 32, the data hierarchy 40 facilitates efficient user navigation and searching and provides control over ownership permissions.

In one embodiment, a set of top level directories 41 are used to root separate data hierarchies 40 for topical groupings of waymarks. For example, the directories 41 could include people, places, and things. Other directories are possible. Within each directory 41, one or more categories 42 and, optionally, one or more successive layers of subcategories 43 can be added to narrow down the specific topical grouping of the waymarks. For example, a places directory could have categories and subcategories for countries, states or provinces, cities, and neighborhoods. Other categories and subcategories are possible.

The waymarks 44 are stored under appropriate categories 42 or, if provided, subcategories 43, to form the leaves of the data hierarchy 40. Other types of organizations for storing the waymarks in addition to or in lieu of a hierarchy, including linked lists and relational structures, are possible.

Finally, the data hierarchy forms an exportable schema 45, which can be exported as a portable data definition schema implemented, for example, as an XML Schema Definition (XSD), to describe and validate the waymarking data for use in a portable, such as XML, environment. Using the schema 45, third party applications can read and download the waymarks 44 in a structured format in which the waymarks 44 are exposed and accessed using the portable data definition schema. Other types of schema definitions and structured formats either in addition to or in lieu of XSD and XML are possible.

Metadata Hierarchy

Figure 5:
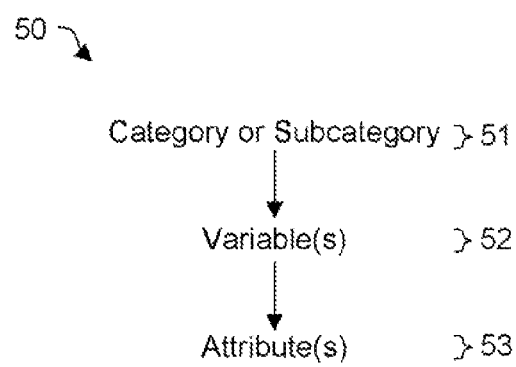
FIG. 5 is a data diagram showing a metadata hierarchy for use in the environment of FIG. 3.

The structure for storing the metadata 17 assigned to each particular form of waymark 44 is also organized into a hierarchy. FIG. 5 is a data diagram showing a metadata hierarchy 50 for use in the environment 30 of FIG. 3. Metadata 17 is unstructured and can be uniquely defined for each particular category or subcategory 51. One or more variables 52 can be associated with each particular category or subcategory 51 and each variable 52 is assigned one or more attributes 53 that describe the type of data storable under the variable 52. For example, a variable for color could have attributes specifying color choices, such as red, green, and blue. Nested variables are possible. In addition, the variables 52 can be inherited by child objects from parent categories or subcategories 51. In a further embodiment, the metadata hierarchy can be included in the schema 45, described above with reference to FIG. 4, for the waymarking data. Other types of organizations for storing the metadata in addition to or in lieu of a hierarchy are possible.

Geospatial Data Ownership and Control

The ownership of categories 42, subcategories 43, and variables 52 can be controlled by the server 31. FIG. 6 is a Venn diagram 60 showing ownership and control over the database 32 of FIG. 3. Categories 42, subcategories 43, and variables 52 can only be created by a single creator 61, which can be a logical group of one or more people. However, the ownership over the category or subcategory, which includes the ability to modify or remove schema properties, can be transferred to another single creator 61 to ensure, for instance, that the characteristics of each category or subcategory remain well-structured and suitable for collaborative use. Individual owners 62 can create, change, and remove specific instances of waymarks 44, but, unless also a creator 61, cannot alter the underlying schema employed for the corresponding category or subcategory. In addition, the roles of creator 61, owner 62, and user 63 can be mutually exclusive or overlapping. For example, a user 63 could simultaneously be the creator 61 and owner 62 for the same object. Other types of ownership and control schemes are possible.

Process for On-Line Collaboration

Figure 7:
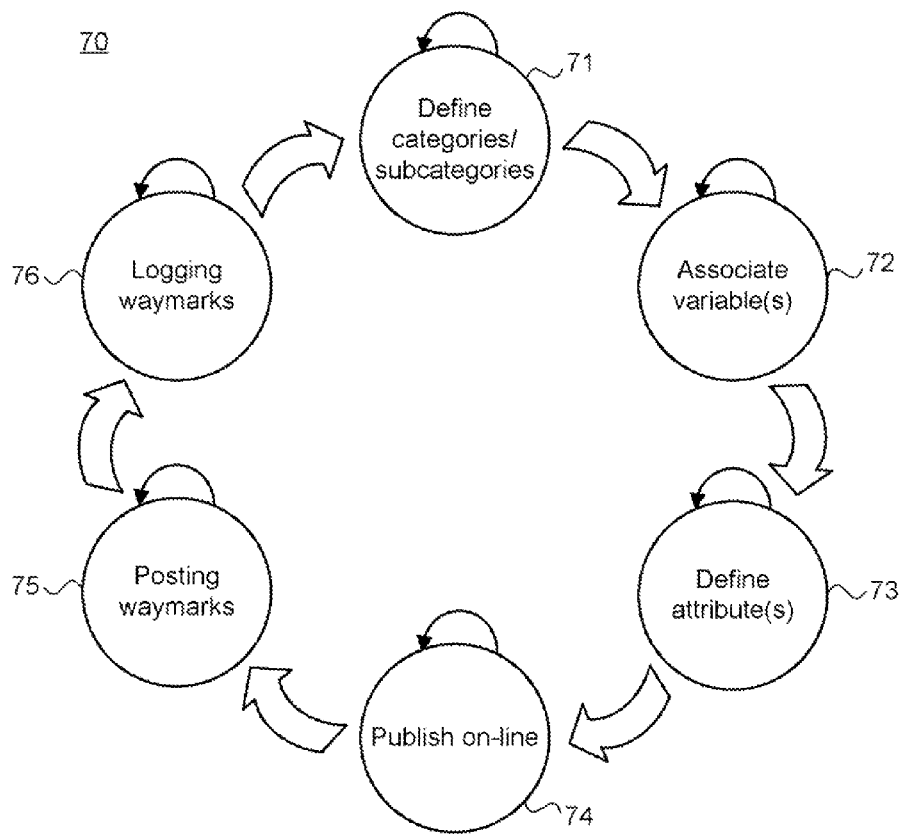
FIG. 7 is a process flow diagram showing waymark category creation and ad hoc compilation of geospatial data for on-line collaboration in the environment of FIG. 3.

On-line collaboration of waymarks 44 occurs as an ongoing and continuously evolving process. FIG. 7 is a process flow diagram showing waymark category creation and ad hoc compilation 70 of geospatial data 33 for on-line collaboration in the environment 30 of FIG. 3. In one embodiment, the use of a hierarchy to structure the organization of waymarks 44 and metadata 17 implies a specific ordering of operations to facilitate waymark sharing.

During waymark category creation, categories 42 and subcategories 43 are first defined (operation 71) to set up the basic structuring for waymark storage under the directories 41. One or more variables 52 can be associated with specific categories 42 or subcategories 43 (operation 72). Similarly, attributes 53 are defined for each of the variables 52 (operation 73). As the metadata 17 is unstructured, the variables 52 and attributes 53 are defined to channel the kinds of information submitted into ad hoc classes of information. Finally, the waymark categories 42 and subcategories 43 are published on-line (operation 74), which allow the user community access to post new waymarks 44 in those categories and subcategories. In one embodiment, the waymarks are published through a Web-based user interface, as further described below beginning with reference to FIG. 8.

Figure 13:
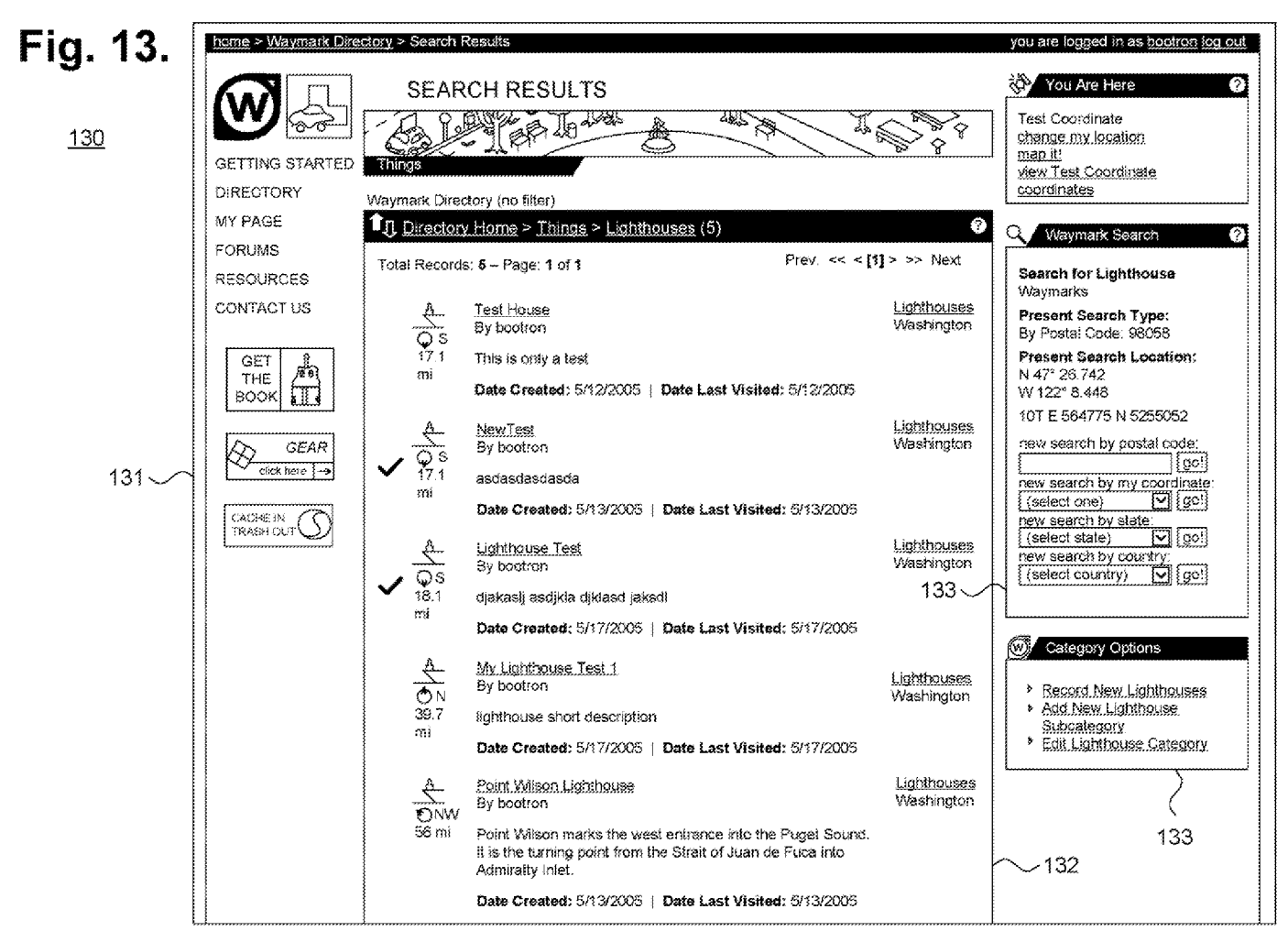

During ad hoc compilation, the user community can post waymarks 33 (operation 75) and create log entries concerning the waymarks (operation 76), as further described below respectively with reference to FIGS. 13 and 14. Waymarks 33 are posted by navigating or searching through the categories and subcategories and entering or editing geospatial data 16 and metadata 17 for the selected waymark 33. Log entries are similarly created navigating or searching through the categories and subcategories to a particular waymark 33 and entering or editing a log entry, which can include narrative text, a rating, further metadata, and other information. Other types of process flows are possible, as would be implied in part by the form of data organization implemented for the waymarks 44 and metadata 17.

Example Web Pages

Figure 8:
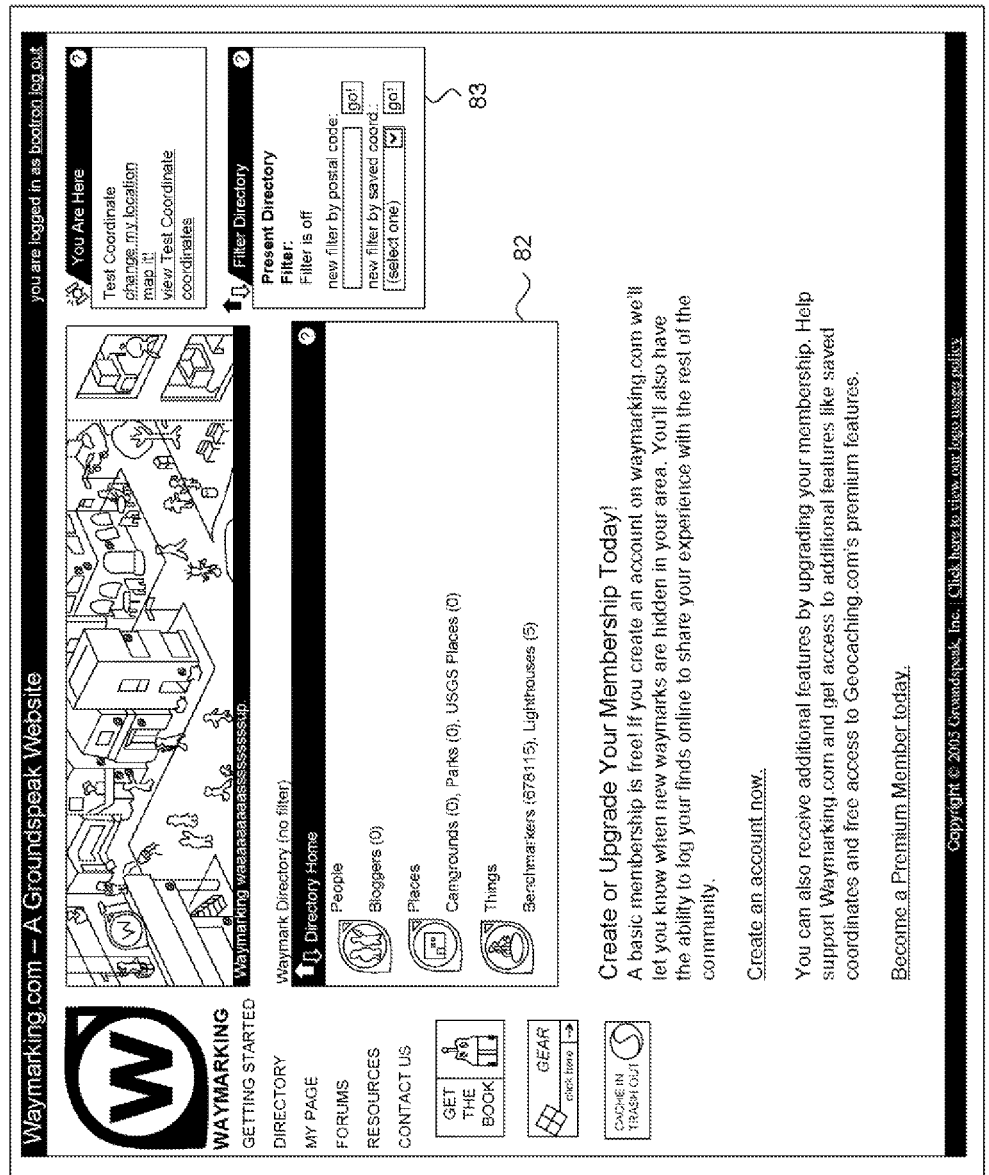
FIG. 8 is a screen shot showing, by way of example, a Web page for navigating a set of directories of waymarks.

A standardized Web-based user interface allows on-line clients 35, 36, 37 that are executing Web browsers to manage, navigate, and search the waymarks. FIG. 8 is a screen shot 80 showing, by way of example, a Web page 81 for navigating a set of directories 82 of waymarks 44. To facilitate navigation in an outline format, the set of directories 82 are presented as links to Web pages of individual categories. In addition, the set of directories presented can be refined by applying a filter 83 to limit scope.

Figure 9:
FIG. 9 is a screen shot showing, by way of example, a Web page for editing a category of waymarks.

A creator 61 can edit their own categories. FIG. 9 is a screen shot 90 showing, by way of example, a Web page 91 for editing a category 92 of waymarks. The creator 61 can edit the category to modify the properties that are displayed to waymark owners 62 and users 63. Other options 93 could be available, for instance, to add variables, manage the category, transfer ownership, and view variables.

Figure 10:
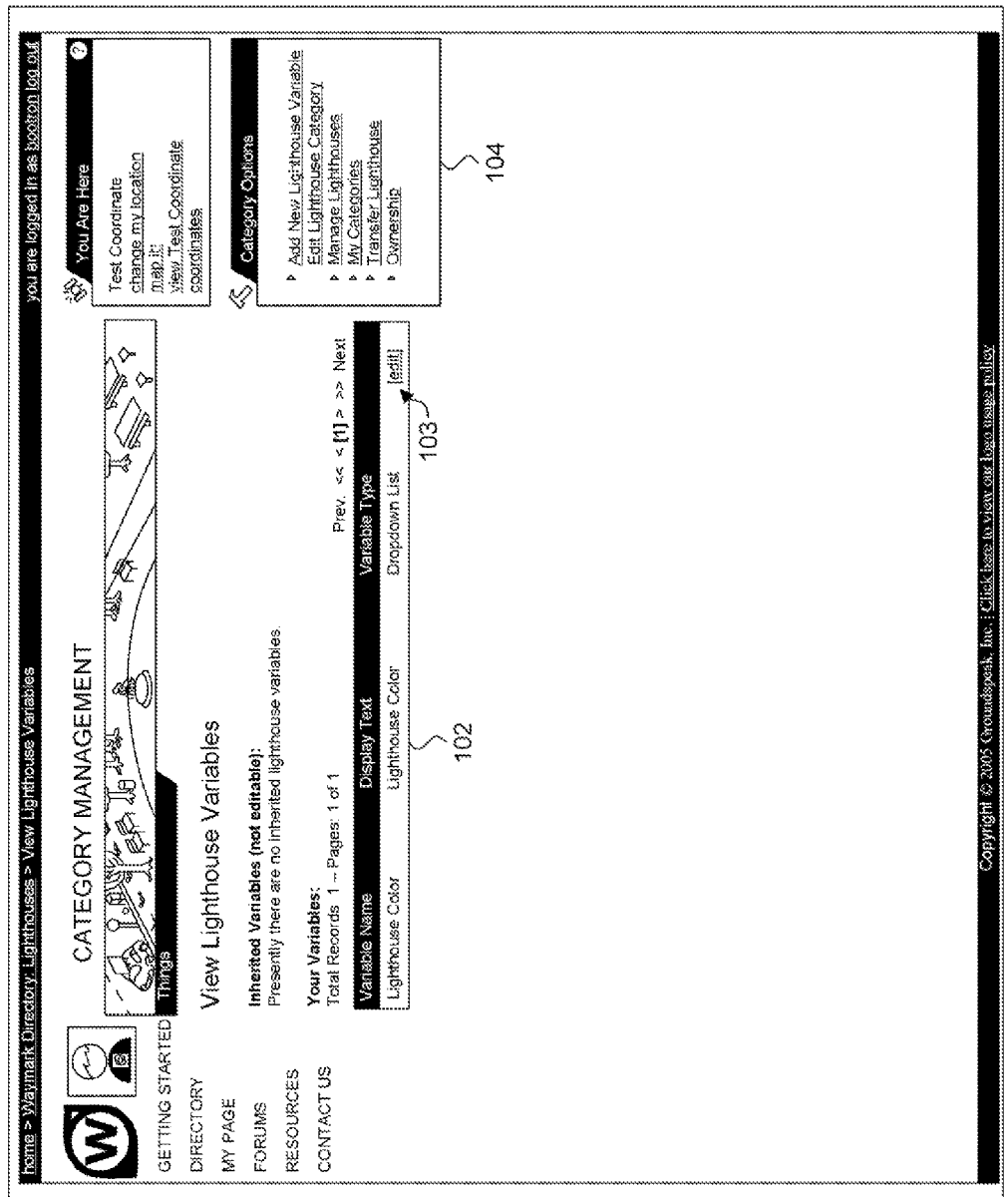
FIG. 10 is a screen shot showing, by way of example, a Web page for viewing category variables.

Similarly, a creator 61 can manage the variables currently defined for a particular category. FIG. 10 is a screen shot 100 showing, by way of example, a Web page 101 for viewing category variables 102. In one embodiment, a summary of each variable 102 is provided and includes a link 103 to Web pages for editing the attributes of the variable. Further options 104 could be available, for instance, to add new variables, edit the category, manage categories, and transfer ownership of the category.

As well, a creator 61 can edit the variables for each category. FIG. 11 is a screen shot 110 showing, by way of example, a Web page 111 for editing category variables 112. Depending upon the type of variable, a set of required attributes 112 and permissive set of options 113 can be provided to define the types of information that can be stored as metadata under the variable. For example, a variable for a lighthouse color could be provided as a dropdown list that includes four colors. Additional colors can also be defined and the entry of an answer by a user 63 can be specified as being mandatory or optional. Other types of variable attribute modifications and organizations are possible.

Figure 12:
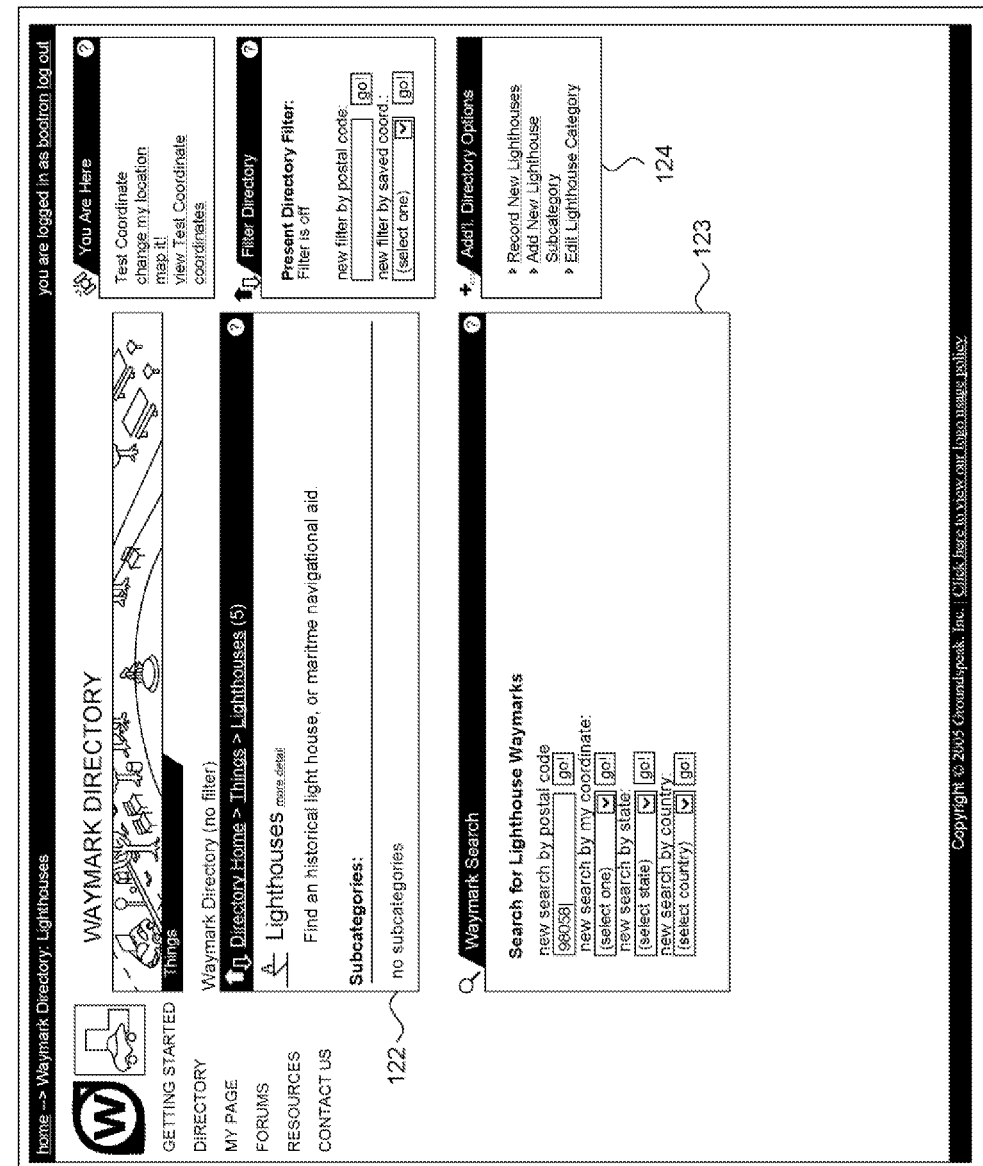
FIG. 12 is a screen shot showing, by way of example, a Web page for ad hoc searching of waymarks.

A user 63 can select a directory link to view the Web page for a particular category or subcategory. FIG. 12 is a screen shot 120 showing, by way of example, a Web page 121 for ad hoc searching of waymarks 122. A capsule summary 122 of the category or subcategory selection is displayed, which can include a set of links for any subcategories. In one embodiment, waymarks 44 can be searched directly thorough a search panel 123 that accepts geolocations, such as postal code, state, or country, as well as coordinates. In a further embodiment, the ability to search on metadata within variables can also be included, such as by color or other metadata variables. Additional options 124 could be available, for instance, to record a new waymark under the category, add a new category, or edit an existing category.

Searching via the search panel 123 generates a set of search results. FIG. 13 is a screen shot 130 showing, by way of example, a Web page 131 for viewing search results 132. By default, the search results 132 are presented in a list format 132 that provides a brief synopsis of each waymark and a link to access the waymark, including any metadata. Additional options 133 could be available, for instance, to record a new category, add a new category, or edit an existing category.

Users 63 can view a particular waymark 44 and can submit commentary via a log. FIG. 14 is a screen shot 140 showing, by way of example, a Web page 141 for a set of log entries 142 regarding waymarks. The log entries are presented in a list format 142 and can include additional information, such as narrative text, a rating, further metadata, and other information. Log entries can be edited by the author of the entry and viewed by all other users.

In a further embodiment, a discussion forum relating to a certain location that is identified by geolocational data can be provided. The location can be free form, that is, the location need not be nearby or containing a waymark, nor, in a further embodiment, be within a zone of influence. For example, a user could start a location-based discussion regarding an object on, around, or near a popular landmark, such as a park. Other users wanting to find discussions close to their own location, or any other location, can search for topics based on that location to find related discussions, including filtering log entries 142 by location and waymark category, as well as other parameters, and by using other types of searches. Thus, another user at a nearby university, for instance, who is searching for topics relating to locations around the university might also find the discussion regarding the park, in addition to other discussions relating to locations that are within their specified search radius.

System for On-Line Collaboration

Figure 15:
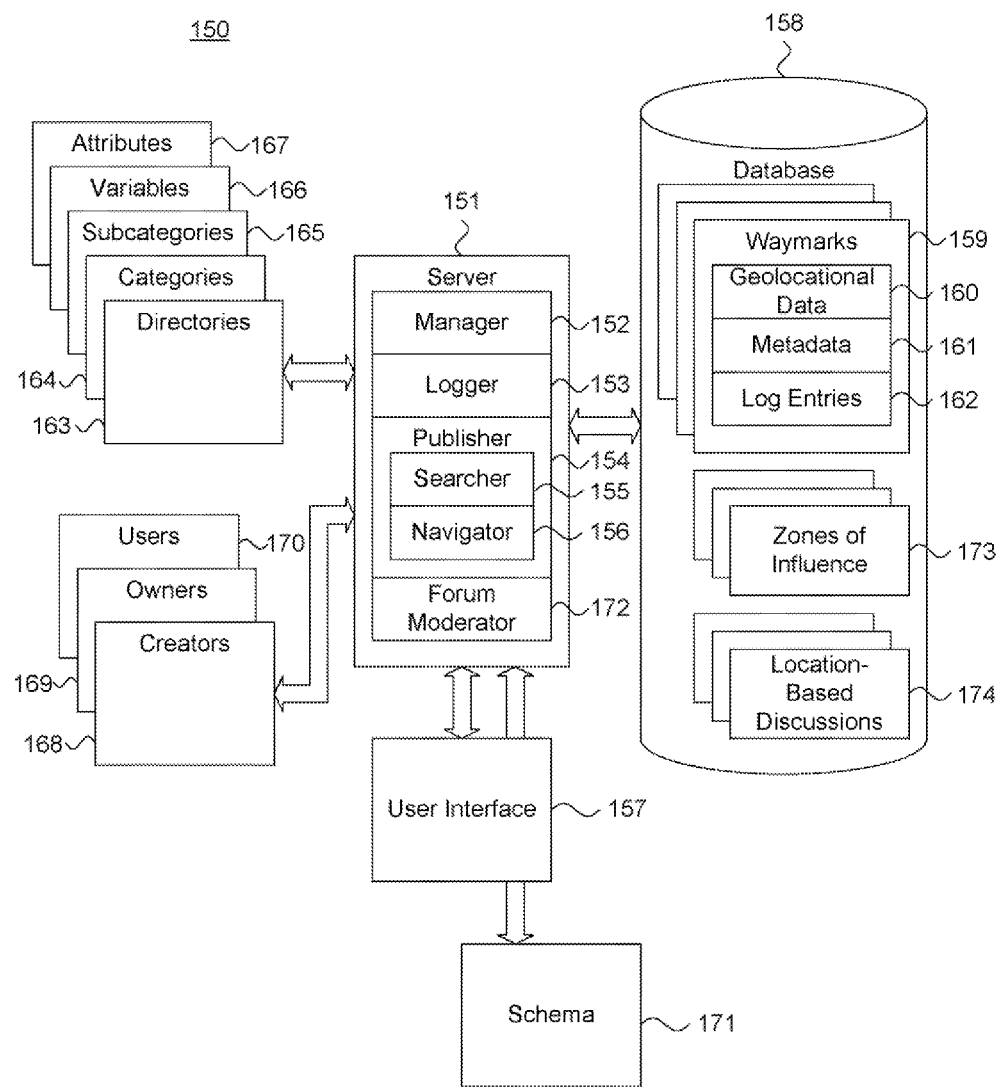
FIG. 15 is a functional block diagram showing a system for facilitating ad hoc compilation of geospatial data for on-line collaboration, in accordance with one embodiment.

The waymarks are centrally stored in a database managed by a server. FIG. 15 is a functional block diagram showing a system 150 for facilitating ad hoc compilation of geospatial data 33 for on-line collaboration, in accordance with one embodiment. The server 150 executes a sequence of programmed process steps, such as described above with reference to FIG. 7, implemented, for instance, on a programmed digital computer system.

A server 151 is interfaced to a database 158 that stores waymarks 159. Each waymark 159 includes geolocational data 160, metadata 161, and the set of log entries 162. The server 151 provides a user interface 157 to the user community. In one embodiment, the user interface 157 is provided as a Web-based interface that can be viewed using a Web browser. Other types of user interfaces are possible.

The server 151 includes a manager 152, logger 153, publisher 154, and, in a further embodiment, a forum moderator 172. The manager 152 processes additions, edits, and deletions to the exportable schema 171, including directories 163, categories 164, subcategories 165, variables 166, and attributes 167. The manager 152 also controls the permissions granted to creators 168, owners 169, and users 170. In a further embodiment, the manager 152 processes the logical placement of physical objects described by waymarks 159 within zones of influence 173.

The logger 153 allows users 63 to create and view log entries 162 for waymarks 159. The log entries 162 are similar to personal blogs, except the overall environment 30 is centrally managed through the server 151. The log entries 162 create a location-based discussion forum that links geolocational data with forum discussions and which can be filtered by both location and waymark category, as well as other parameters.

The publisher 154 provides access to the waymarks 159 to the user community on-line via the user interface 157. The publisher 154 includes a searcher 155 and navigator 156 for respectively searching and navigating through the waymark data hierarchy and waymark data. Other functionality could be provided in the server 151 either in addition to or in lieu of the foregoing components.

In a further embodiment, the forum moderator 172 facilitates location-based discussions 174 relating to locations identified by geolocational data. The locations can be free form and need not be nearby or containing a waymark 159, nor, in a further embodiment, be within a zone of influence 173.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for generating waymarks, comprising:
    a database of waymarks each associated with a category;
    a waymark generator to generate a new waymark, comprising:
        geospatial data defining a location, metadata describing a physical object associated with the location and at least one photograph of the physical object at the location defined by the geospatial data;
        zone of influence data defining a logically-enclosed space that is overlaid on the location for the new waymark, wherein the physical object associated with the location is placed within the zone of influence;
        a compiler to compile the geospatial data, metadata, photograph, and zone of influence data as the new waymark; and
        a waymark module to assign one of the categories to the new waymark and to add the new waymark to the database; and
    a search module to provide a search option for accessing the waymark by at least one of the location and the category.

2. A system according to claim 1, further comprising:
    an ownership module to manage ownership control over the database.

3. A system according to claim 1, further comprising:
    a metadata structure module to structure the metadata for each waymark based on a hierarchy.

4. A system according to claim 1, further comprising:
    a search module to receive a query for one or more of the waymarks, to apply the query to the database of waymarks, and to return at least one of the waymarks that matches the query as results.

5. A system according to claim 4, further comprising:
    a display module to display each search result with a brief summary of the corresponding waymark and a link to access the waymark.

6. A system according to claim 1, further comprising:
    a search module to conduct a search for one or more of the waymarks via a search panel using at least one of the geospatial data and metadata.

7. A system according to claim 1, further comprising:
    a search module to conduct a search for one or more of the waymarks via a set of directories.

8. A system according to claim 7, wherein the directories are each presented as links to Web pages of individual categories.

9. A system according to claim 1, further comprising:
    a category module to add a new category or to edit at least one of the categories.

10. A system according to claim 1, further comprising:
    a waymark structure module to structure the waymarks by defining each of the categories, comprising:
        a variable module to associate one or more variables with each of the categories; and
        an attribute module to define attributes for the variables.

11. A computer-implemented method for generating waymarks, comprising:
    maintaining a database of waymarks each associated with a category;
    generating a new waymark, comprising:
        receiving from a user, geospatial data defining a location, metadata describing a physical object associated with the location and at least one photograph of the physical object at the location defined by the geospatial data;
        receiving zone of influence data defining a logically-enclosed space that is overlaid on the location for the new waymark, wherein the physical object associated with the location is placed within the zone of influence;
        compiling the geospatial data, metadata, photograph, and zone of influence data as the new waymark;
        assigning one of the categories to the new waymark; and
        adding the new waymark to the database; and
    providing a search option for accessing the waymark by at least one of the location and category.

12. A method according to claim 11, further comprising:
    managing ownership control over the database.

13. A method according to claim 11, further comprising:
    structuring the metadata for each waymark based on a hierarchy.

14. A method according to claim 11, further comprising:
    receiving a query for one or more of the waymarks;
    applying the query to the database of waymarks; and
    returning at least one of the waymarks that matches the query as results.

15. A method according to claim 14, further comprising:
    displaying each search result with a brief summary of the corresponding waymark and a link to access the waymark.

16. A method according to claim 11, further comprising:
    conducting a search for one or more of the waymarks via a search panel using at least one of the geospatial data and metadata.

17. A method according to claim 11, further comprising:
    conducting a search for one or more of the waymarks using a set of directories.

18. A method according to claim 17, wherein
    wherein the directories are each presented as links to Web pages of individual categories.

19. A method according to claim 11, further comprising at least one of:
    adding a new category; and
    editing at least one of the categories.

20. A method according to claim 11, further comprising:
    structuring the waymarks by defining each of the categories, comprising:
        associating one or more variables with each of the categories; and
        defining attributes for the variables.

* * * * *